(12) United States Patent
Ono (10) Patent No.: US 8,671,374 B2
(45) Date of Patent: Mar. 11, 2014

(54) INFORMATION PROCESSING APPARATUS (75) Inventor: Koki Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 87 days.

(21) Appl. No.: 12/796,731

(22) Filed: Jun. 9, 2010

(65) Prior Publication Data
US 2011/0066990 A1 Mar. 17, 2011

(30) Foreign Application Priority Data
Sep. 16, 2009 (JP) ................................. 2009-214077

(51) Int. Cl.
G06F 9/455 (2006.01)
G06F 17/50 (2006.01)

(52) U.S. Cl.
USPC .......................................... 716/108; 716/106

(58) Field of Classification Search
USPC ......................................................... 716/108
See application file for complete search history.

(56) References Cited

U.S. PATENT DOCUMENTS

| 7,475,297 | B1 | 1/2009 | Manaker, Jr. | |
| 2004/0123259 | A1 | 6/2004 | You et al. | |
| 2004/0164769 | A1* | 8/2004 | Sung et al. | 326/98 |
| 2005/0097491 | A1* | 5/2005 | Katayose | 716/10 |
| 2007/0050742 | A1* | 3/2007 | Yonezawa | 716/6 |

FOREIGN PATENT DOCUMENTS

| JP | 63-229510 A | 9/1988 |
| JP | 09-198420 A | 7/1997 |
| JP | 11-328244 A | 11/1999 |
| JP | 2003-022293 A | 1/2003 |
| JP | 2003162561 A | 6/2003 |
| JP | 2005-136286 A | 5/2005 |
| JP | 2007-095028 A | 4/2007 |
| JP | 2007-242015 A | 9/2007 |
| JP | 2007-328788 A | 12/2007 |
| JP | 2010-079737 A | 4/2010 |

OTHER PUBLICATIONS

Shigeyoshi Ohara, "Basic FPGA timing analysis (1): Why correct timing analysis is important now? (2/3)", [online], IT media Inc., Oct. 31, 2008, [Searched on May 27, 2013], Internet <URL: http://monoistatmarkit.co.jp/mn/articles/0810/31/news140_2.html >, Concise English language explanation provided in JP Office Action.
Japanese Office Action for JP 2009-214077 mailed on Jun. 4, 2013 with English Translation.

* cited by examiner

Primary Examiner — Paul Dinh
Assistant Examiner — Bryce Aisaka
(74) Attorney, Agent, or Firm — Sughrue Mion, PLLC (57) ABSTRACT

An information processing apparatus which includes a storage unit having stored a design data denoting layout and connection of a circuit, and a timing constraint data including a clock skew value denoting a delay difference allowed for a clock inputted to a pair of elements; a data read-out unit for reading out the design data and the timing constraint data; a clock skew value acquisition unit for acquiring the clock skew value set in correspondence with the pair of elements in layout in the circuit denoted by the design data from the timing constraint data; and a slack calculation unit for calculating a delay time between the pair of elements on the basis of the design data, and calculating a slack value indicating whether or not the pair of elements meets a predetermined design requirement by utilizing the acquired clock skew value and the calculated delay time with respect to the pair of elements.

6 Claims, 10 Drawing Sheets

```
CLOCK=CLK
( MESH1 , 200 , 100 )
( L1_* , 100 , 50 )
( L2_* , 20 , 10 )
```

| lm0 | Ideal_skew | Virtual_skew |
|---|---|---|
| HW AMOUNT FE/Util | 41.02 % | 36.68 % |
| PT/Area | 77817432 | 77766696 |
| WIRING CONDITION (geomErr) | 2970 | 118 |
| Hold dominant clock | 296/-0.065 | 0/0.15 |
| other clock | 0/0.65 | 0/0.053 |
| Setup dominant clock | 5/-0.534 | 18/-0.158 |
| other clock | 14/-1.848 | 14/-0.766 |
| TAT | 17.5h | 13h |

Fig.10A

Fig.10B (12) United States Patent
US 8,671,374 B2

INFORMATION PROCESSING APPARATUS

INCORPORATION BY REFERENCE

The present application claims priority from Japanese Patent Application No. 2009-214077, filed on Sep. 16, 2009 in Japan, the disclosure of which is incorporated herein by reference in its entirety.

TECHNICAL FIELD

The present invention relates to information processing apparatuses and, in particular, to an information processing apparatus for support of designing integrated circuits.

BACKGROUND ART

At present, CAD (Computer Aided Design) is utilized to carry out design of LSI (Large Scale Integration), and also to perform optimization and delay analysis for the post-layout circuit.

Figure 1:
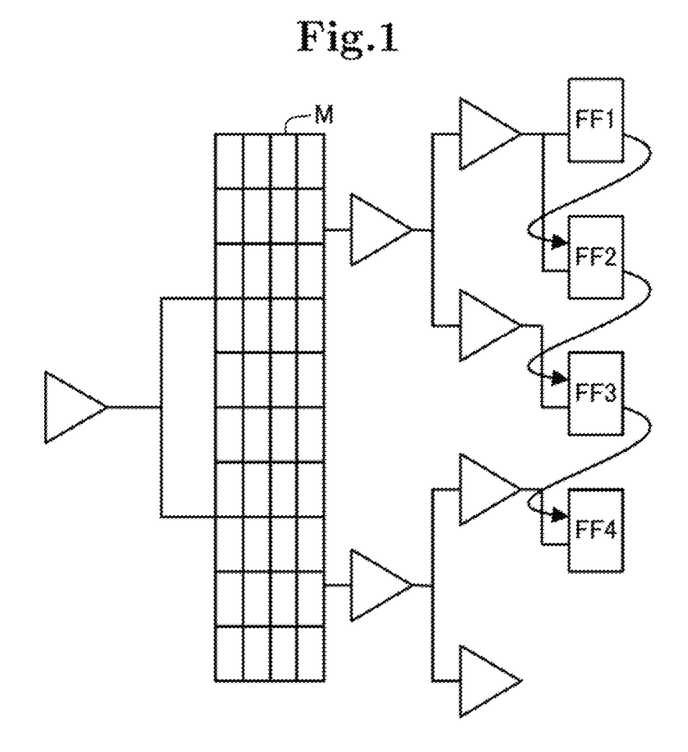
FIG. 1 is a diagram showing an example of a circuit configuration for describing technologies related to the present invention.

In particular, for the clock structure of a high-end LSI, a mesh architecture (see the portion M of FIG. 1) may be utilized which distributes the clock signal in a grid (mesh) pattern similar to that of a go board. Hence, the clock delay difference in the entire circuit becomes small, and the inner-chip clock delay variation due to on-chip variation is reduced. Thereby, it is possible to diminish the clock skew. However, because there are also disadvantageous aspects in wiring resource and power consumption for distributing the clock mesh to an area as large as all over the chip, a method is provided to utilize in combination a tree structure in the terminal local area close to FF (Flip Flop) and the like. For example, it is conceivable to design a circuit as shown in FIG. 1.

Herein, after the CTS (Clock Tree Synthesis) which was determined by the clock distribution netlist, not an ideal skew analysis but a skew analysis is generally made through calculating the clock with the actual delay of clock line. However, in the cases of mesh clock configuration and hierarchical layout design, an ideal skew analysis is more frequently made even after CTS. The reason is because in the case of mesh clock, in order to calculate a correct clock delay, it is necessary to implement "SPICE (Simulation Program with Integrated Circuit Emphasis)" which is a software for simulating the behavior of an electronic circuit; however, since the implementation takes time, it is often omitted. Further, in the case of hierarchical design, there are only segments of a whole mesh structure left in terms of a hierarchical design, thereby giving rise to difficulties in making an actual clock delay analysis.

[Patent Document 1] JP 2003-162561 A

As described hereinabove, in designing a circuit, it is necessary to make ideal skew (clock) analysis. However, in ideal skew analysis, if only one assumable maximum value is regarded as the skew value, the problem may occur that the analysis may become such that has an excessively great margin. For instance, in the example shown in FIG. 1, between FF1 and FF2, the skew becomes minimum because of the final stage driver branch, while between FF2 and FF3, the skew becomes greater than that between FF1 and FF2 because of the local distribution route branch. Further, between FF3 and FF4, the skew becomes even greater because of the mesh branch. In this case, the problem may occur that even though the timing analysis and the like are made with only one maximum value as the skew value, the allowable range may become of the excessively great analysis result, thereby failing to acquire preferable results.

Further, the Patent Document 1 discloses a method for timing analysis of circuits. In this method, hold time analysis is made in the processes of: specifying a clock signal branch point, calculating the delay time of clock signal from the branch point, and deriving the timing margin based on the delay time. However, with the above technology, since the timing margin is set in compliance with the delay time, a suitable timing margin cannot be set for a complicated circuit configuration. Therefore, the problem may occur that the hold time analysis comes down in precision.

SUMMARY

In view of the above, an exemplary object of the present invention is to provide an information processing apparatus capable of restraining the analysis precision from coming down in designing integrated circuits, which is the problem described hereinabove.

In order to achieve this exemplary object, an aspect in accordance with the present invention provides an information processing apparatus which includes: a storage unit having stored a design data denoting layout and connection of a pre-designed circuit, and a timing constraint data including a clock skew value being preset respectively between a pair of elements in layout in the circuit and denoting a delay difference allowed for a clock inputted to each of the pair of elements from one of which to the other of which a data is inputted; a data read-out unit for reading out the design data and the timing constraint data from the storage unit; a clock skew value acquisition unit for acquiring the clock skew value set in correspondence with the pair of elements in layout in the circuit denoted by the design data from the timing constraint data; and a slack calculation unit for calculating a delay time between the pair of elements on the basis of the design data, and calculating a slack value indicating whether or not the pair of elements meets a predetermined design requirement by utilizing the acquired clock skew value and the calculated delay time with respect to the pair of elements.

Further, another aspect in accordance with the present invention provides a computer program product including computer implementable instructions to make an information processing apparatus function as: a data read-out unit for reading out a design data and a timing constraint data from a storage unit having stored the design data denoting layout and connection of a pre-designed circuit, and the timing constraint data including a clock skew value being preset respectively between a pair of elements in layout in the circuit and denoting a delay difference allowed for a clock inputted to each of the pair of elements from one of which to the other of which a data is inputted; a clock skew value acquisition unit for acquiring the clock skew value set in correspondence with the pair of elements in layout in the circuit denoted by the design data from the timing constraint data; and a slack calculation unit for calculating a delay time between the pair of elements on the basis of the design data, and calculating a slack value indicating whether or not the pair of elements meets a predetermined design requirement by utilizing the acquired clock skew value and the calculated delay time with respect to the pair of elements.

Further, still another aspect in accordance with the present invention provides an information processing method which adopts the configurations of: reading out a design data and a timing constraint data from a storage unit having stored the design data denoting layout and connection of a pre-designed circuit, and the timing constraint data including a clock skew value being preset respectively between a pair of elements in layout in the circuit and denoting a delay difference allowed for a clock inputted to each of the pair of elements from one of which to the other of which a data is inputted; acquiring the clock skew value set in correspondence with the pair of elements in layout in the circuit denoted by the design data from the timing constraint data; and calculating a delay time between the pair of elements on the basis of the design data, and calculating a slack value indicating whether or not the pair of elements meets a predetermined design requirement by utilizing the acquired clock skew value and the calculated delay time with respect to the pair of elements.

By virtue of the above configurations, the present invention is able to realize an appropriate and expeditious circuit design in designing LSI.

EXEMPLARY EMBODIMENT

A First Exemplary Embodiment

Figure 2:
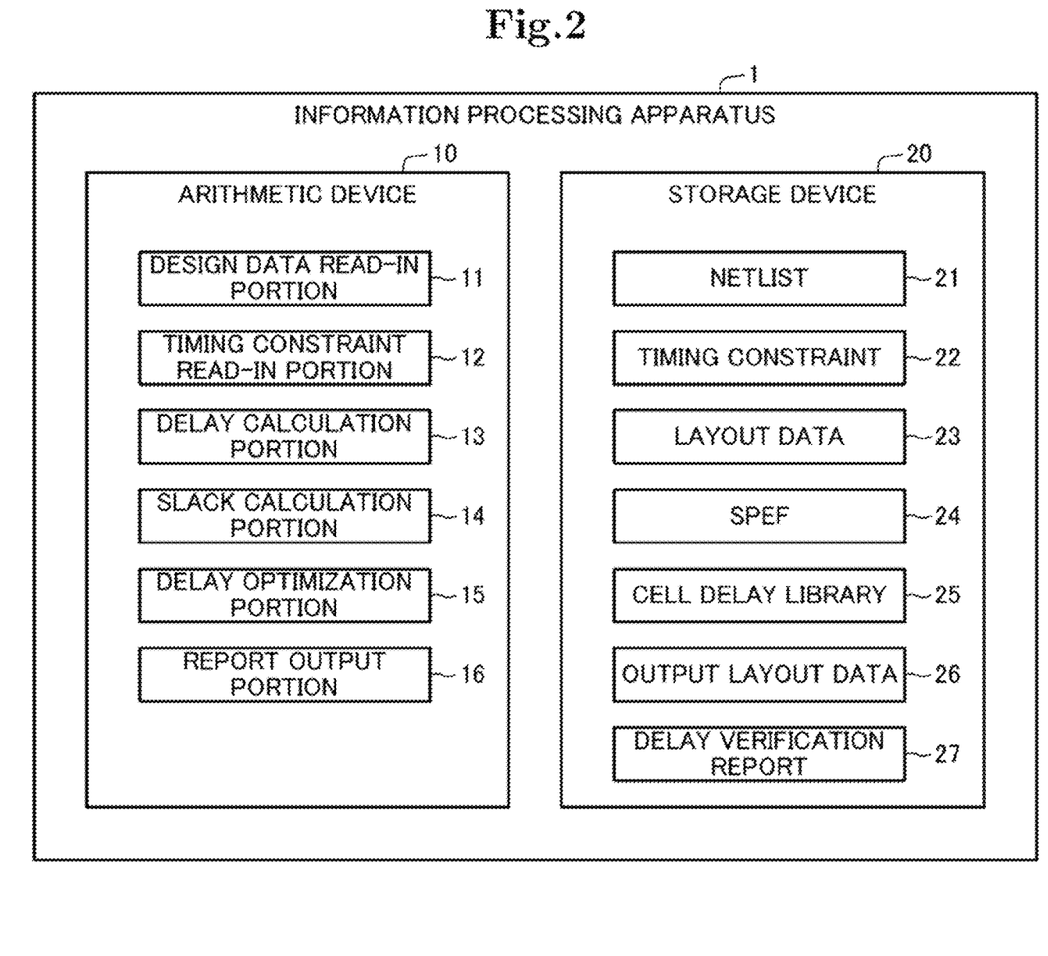
FIG. 2 is a functional block diagram showing a configuration of an information processing apparatus in accordance with a first exemplary embodiment of the present invention.
Figure 3:
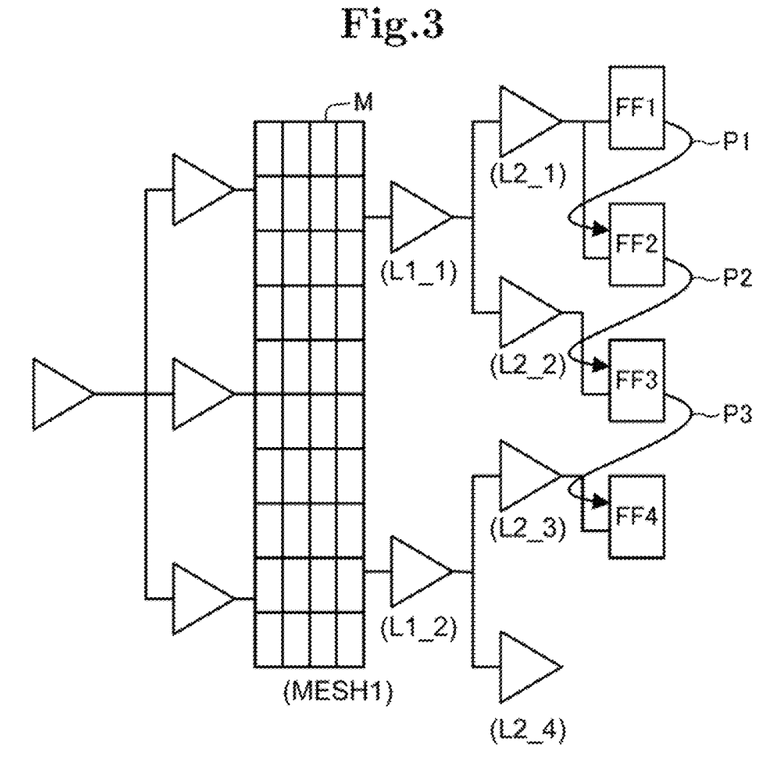
FIG. 3 is a diagram showing an example of a circuit configuration stored in the information processing apparatus disclosed in FIG. 2.
Figure 4:
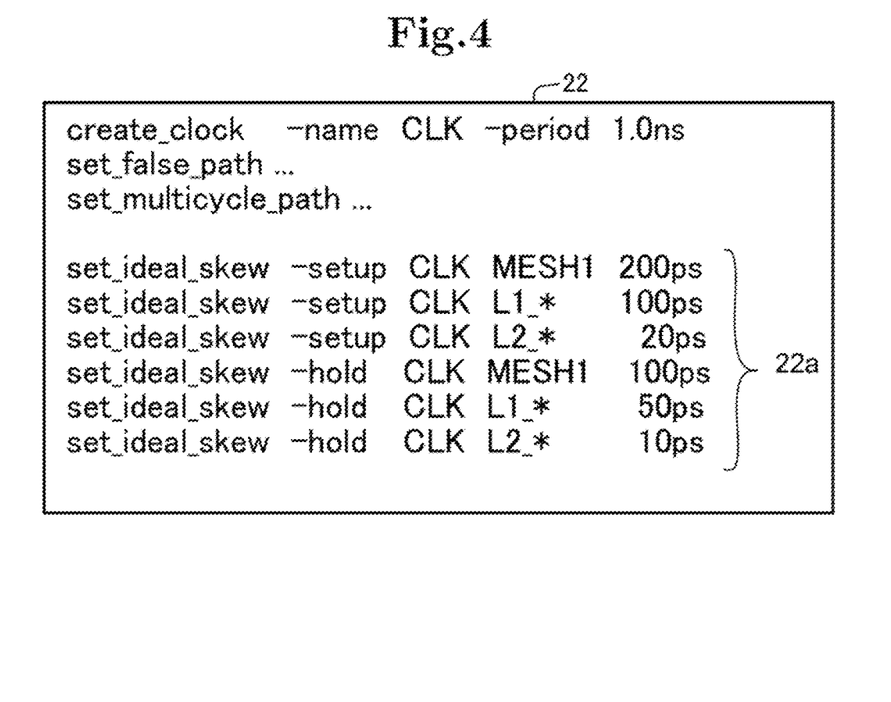
FIG. 4 is a diagram showing an example of a timing constraint data stored in the information processing apparatus disclosed in FIG. 2.
Figure 5:
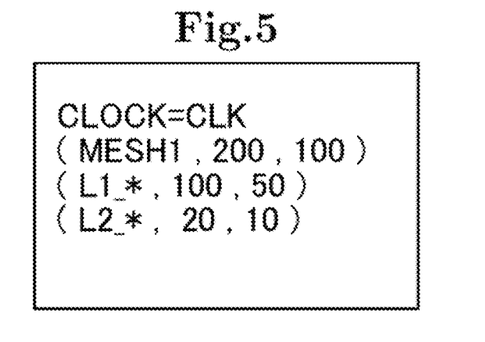
FIG. 5 is a diagram showing an example of an ideal skew table created by and stored in the information processing apparatus disclosed in FIG. 2.
Figure 6:
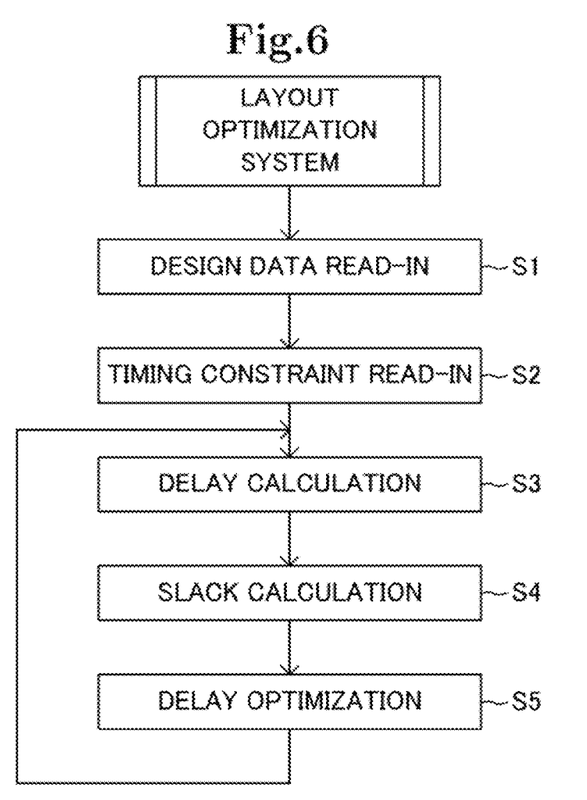
FIG. 6 is a flowchart showing a behavior of the information processing apparatus disclosed in FIG. 2.
Figure 7:
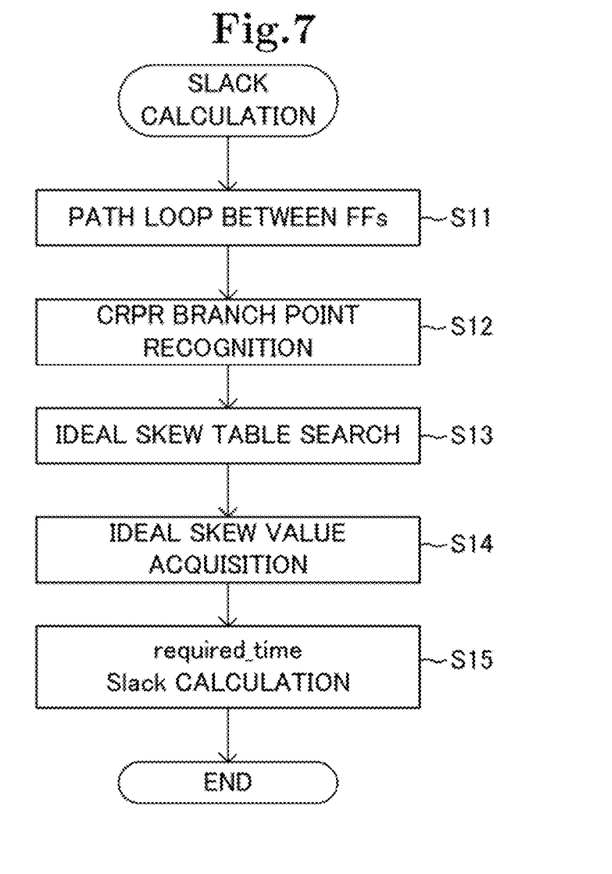
FIG. 7 is a flowchart showing details of a slack calculation process which is a part of the behavior of the information processing apparatus disclosed in FIG. 6.
Figure 8:
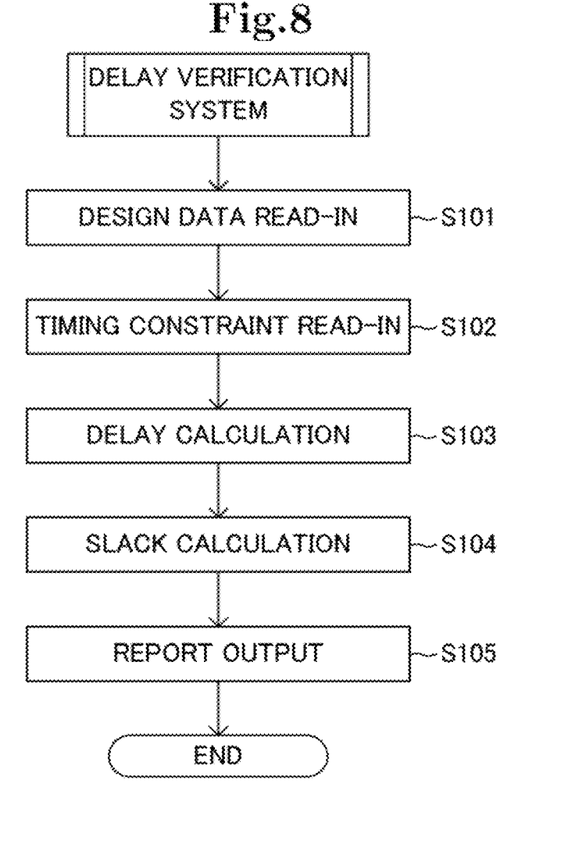
FIG. 8 is a flowchart showing another behavior of the information processing apparatus disclosed in FIG. 2.
Figure 9:
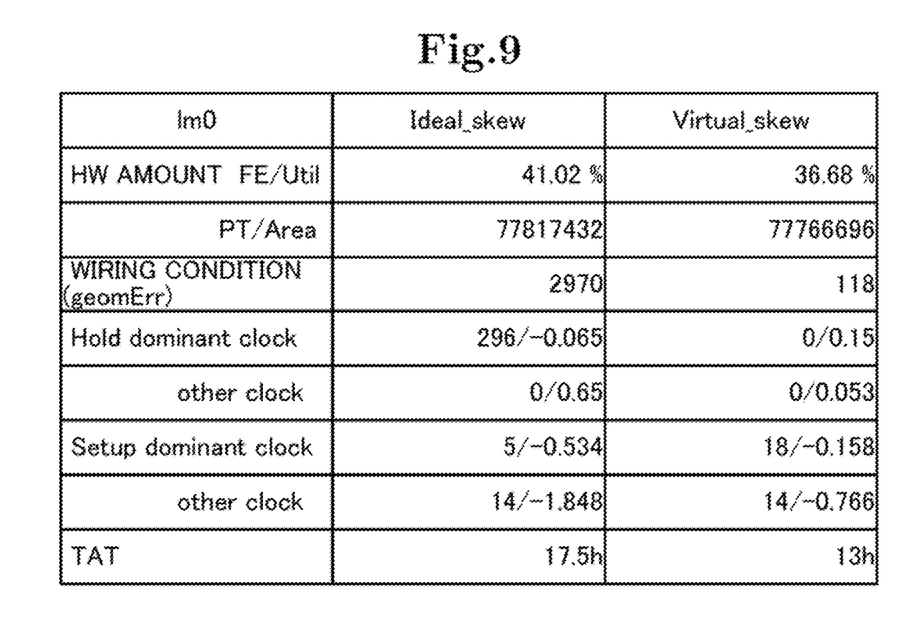
FIG. 9 is a diagram for explaining an effect from a circuit layout optimization process carried out by the information processing apparatus disclosed in FIG. 2.
Figure 10A:
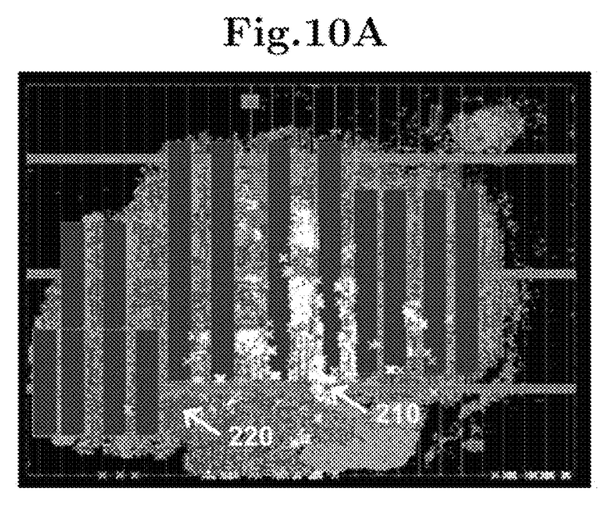
FIG. 10A is a graph for explaining the effect from the circuit layout optimization process carried out by the information processing apparatus disclosed in FIG. 2.
Figure 10B:
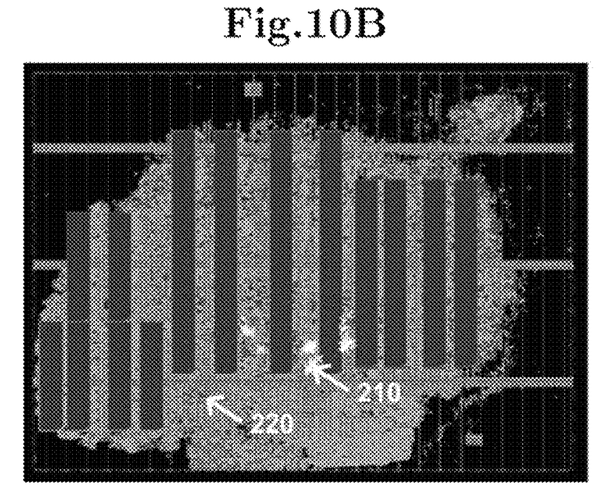
FIG. 10B is another graph for explaining the effect from the circuit layout optimization process carried out by the information processing apparatus disclosed in FIG. 2.

Hereinafter, descriptions will be made with respect to a first exemplary embodiment of the present invention in reference to the accompanying FIGS. 2 to 10. FIG. 2 is a functional block diagram showing a configuration of an information processing apparatus in accordance with the first exemplary embodiment. FIG. 3 is a diagram showing an example of a configuration of a circuit which is a design object, and FIG. 4 is a diagram showing an example of a timing constraint data of the circuit. FIG. 5 is a diagram showing an example of an ideal skew table created by the information processing apparatus. FIGS. 6 to 8 are flowcharts showing behaviors of the information processing apparatus. FIG. 9 is a diagram and FIGS. 10A and 10B are graphs for explaining an effect from a circuit layout optimization process.

[Configuration]

As shown in FIG. 2, an information processing apparatus 1 in accordance with the first exemplary embodiment is a common computer which includes an arithmetic device 10 such as a CPU (Central Processing Unit), and a storage device 20 such as a hard disk drive and the like.

Then, the information processing apparatus 1 includes the following portions which are constructed by incorporating programs into the arithmetic device 10: a design data read-in portion 11, a timing constraint read-in portion 12, a delay calculation portion 13, a slack calculation portion 14, a delay optimization portion 15, and a report output portion 16. With these respective portions or configurations, the information processing apparatus 1 comes to, as will be described hereinafter, function as an optimization system for supporting layout optimization for the circuit data after CTS (Clock Tree Synthesis), as well as a delay verification system for verifying circuit delay. In addition, the programs incorporated into the arithmetic device 10 may be prestored in the storage device 20, or stored in other storage media and supplied into the arithmetic device 10.

The storage device 20 stores the following data to be inputted into the arithmetic device 10: a netlist 21, a timing constraint 22, a layout data 23, an SPEF (Standard Parasitic Exchange Format) 24, and a cell delay library 25. Further, the storage device 20 stores the following data to be outputted from the arithmetic device 10: an output layout data 26 and a delay verification report 27. Hereinbelow, a detailed description will be made with respect to configurations of the arithmetic device 10 and the storage device 20.

The layout data 23 stored in the storage device 20 contains layout information of a circuit after place and route. The netlist 21 contains information denoting a logical connection in correspondence with the layout data 23. The timing constraint 22 contains clock period definition, ideal skew definition, and exceptional timing specification such as multicycle path (on which setup delay is allowed within multiple cycles) and the like of the circuit. The SPEF (Standard Parasitic Exchange Format) 24 contains resistance and capacitance (coupling capacitance) pre-extracted from the parasitic information with a common RC extraction tool for the wiring by the layout data 23. The cell delay library 25 contains delay information between the input and output terminals of leaf cell, and/or setup time and hold time of sequential element.

Further, the delay verification report 27 to be stored afterwards in the storage device 20 is an output result from the arithmetic device 10, containing path information of setup and/or hold delay violation verified through timing analysis by the delay verification system. The output layout data 26 is such that has been through delay optimization by the layout optimization system.

Here in the exemplary embodiment, it is presumed that the information is designed beforehand which denotes the circuit after CTS (Clock Tree Synthesis), and of the configuration shown in FIG. 3, by virtue of the design data which denote the layout and connection of the circuit, such as the layout data 23, the netlist 21, the SPEF 24, and the cell delay library 25. The circuit shown in FIG. 3 has, especially, a mesh clock circuit M, and a tree structure circuit at the stage after the mesh clock circuit. Further, by virtue of this configuration, the mesh clock circuit M per se serves as a branch point, and each branch of the tree structure circuit portion serves respectively as each branch point; the information for specifying these respective branch points is assigned in parentheses to be illustrated in FIG. 3. Further, in the exemplary embodiment, explanations are made with a circuit having a tree structure circuit at the stage after a mesh clock circuit as the object for optimization or analysis; however, it is just an example, and a circuit of tree structure only may also be applied.

Further, the timing constraint 22 is, for example, the data shown in FIG. 4, including, especially, an ideal skew definition (clock skew value) which has been preset respectively between a pair of elements in layout in the circuit and which denotes a delay difference allowed for a clock to be inputted to each of the pair of elements from one of which (FF: Flip Flop, for example) to the other of which a data is inputted. The ideal skew definition defines the ideal skew of the path between the flip flops (FF) which are the elements distributed after the branch point for each clock name and for each definition point (=clock path branch point).

In particular, in the example of the timing constraint 22 shown in FIG. 4, the ideal skew is defined for the clock name and definition point on each of the lines in the portion 22a. Herein, the first column "set_ideal_skew" on each line of the portion 22a is the reserved word indicating a definition statement of ideal skew. The second column indicates whether the skew to be defined is for setup analysis ("-setup") or for hold analysis ("-hold"). The third column shows the object clock name. The forth column shows the net name or instance name (the symbol in parentheses of FIG. 3) indicating the branch point at which a pair of elements in connection with each other are distributed. The fifth column shows the skew value based on the unit such as "ps (picosecond)" and the like. Then, in the example of the portion 22a of FIG. 4, first, from the first line to the third line, the skews for setup analysis are defined. Especially, the first line shows the case of the branch point of the mesh portion M (MESH1), the second line shows the case of the branch point of the first stage of local distribution (L1_*), and the third line shows the case of the branch point of the second stage of local distribution (L2_*) in reference to FIG. 3, respectively. In the same manner, from the forth line to the sixth line in the portion 22a of FIG. 4, the skew for hold analysis is defined according to each case of the respective branch points.

Further, the design data read-in portion 11 (data read-out unit) reads in the various data prestored in the storage device 20: the netlist 21, the timing constraint 22, the layout data 23, the SPEF 24, and the cell delay library 25, so as to construct a data structure in the memory for subsequent processes.

Further, the timing constraint read-in portion 12 reads in the ideal skew definition 22a included in the timing constraint 22 shown in FIG. 4 described hereinabove, and creates an ideal skew table as shown in FIG. 5 illustrating the definition point (branch point) and the skew value(s) in pair and then stores the same temporarily. In particular, the ideal skew table is of such a format as: (definition point, skew value for setup analysis, skew value for hold analysis).

Further, the delay calculation portion 13 calculates each cell delay, setup_time, hold_time, and interconnection delay with reference to the cell delay library 25 on the basis of the resistance and capacitance values of wiring obtained from the SPEF 24.

Further, the slack calculation portion 14 first traces the clock netlist structure in which the FFs in pair are distributed in the circuit as shown in FIG. 3, recognizes the CRPR (Clock Reconvergence Pessimism Removal) branch point, searches for the place where the definition point of the ideal skew table matches the CRPR branch point, so as to acquire the ideal skew value of each branch point, that is, to obtain the ideal skew value which has been preset as the timing constraint 22 in correspondence with each path between the FFs. Then, the slack calculation portion 14 utilizes the ideal skew value to calculate required_time. Herein, the required_time for setup analysis is the time of clock cycle minus setup_time minus skew. Further, the required_time for hold analysis is the time of hold_time plus skew.

Then, the slack calculation portion 14 accumulates the cell delay, setup_time and interconnection delay which are figured out by the delay calculation portion 13 described hereinabove, calculates the arrival_time of data line, and calculates the slack value. Herein, the slack value refers to the time of required_time minus arrival_time, indicating whether or not the path between the FFs meets a predetermined design requirement. For example, when the slack value becomes minus, it is considered that the constraint request is not satisfied.

In the above manner, the aforementioned timing constraint read-in portion 12, delay calculation portion 13 and slack calculation portion 14 function firstly as a clock skew value acquisition unit for acquiring the ideal skew value of each branch point between the FFs, that is, of each path between the FFs in layout in the circuit denoted by the netlist 21 and the like as shown in FIG. 3, from the timing constraint 22 via the ideal skew table. Meanwhile, the unit acquires, especially, the ideal skew value for each clock provided to the FFs, and for setup analysis and hold analysis, respectively.

Further, the abovementioned timing constraint read-in portion 12, delay calculation portion 13, and slack calculation portion 14 function as a slack calculation unit which utilizes the acquired ideal skew value to calculate the slack value, while calculating the delay time between the FFs. Meanwhile, the unit calculates, especially, the respective slack values of setup and hold.

Further, the abovementioned delay optimization portion 15 performs delay optimization for the path group of violation among the paths calculated by the slack calculation portion 14; for example, changing the circuit, returning to the delay calculation portion 13 for recalculating the slack value to see if the violation paths have disappeared, and repeating this process until the predetermined termination condition (time limit or repeat loop number) is met. That is, the delay optimization portion 15 operates when the information processing apparatus 1 functions as a layout optimization system.

Further, the abovementioned report output portion 16 outputs mainly the information of violation path, including the complementary information such as the slack value, the arrival_time, setup_time and hold_time of the calculation process, and the like, to a display, a printer, or the like. That is, the report output portion 16 operates when the information processing apparatus 1 functions as a delay verification system.

[Behavior]

Next, descriptions will be made with respect to behaviors of the information processing apparatus 1 of the abovementioned configuration with reference to FIGS. 6 to 8. Herein, it is presumed that the following data are stored in the storage device 20: the netlist 21, the layout data 23 and the SPEF 24 which denote a circuit with a connection image as shown in FIG. 3.

First, in the information processing apparatus 1, the design data read-in portion 11 reads in the netlist 21, the layout data 23, and the SPEF 24 (step S1). Next, the timing constraint read-in portion 12 reads in the timing constraint 22 as shown in FIG. 4 (step S2). In this timing constraint 22, the portion 22a is, especially, the ideal skew definition; for the clock name "CLK", the definition points (MESH1, L1_*, L2_* in the example of portion 22a), and the corresponding skew values for setup analysis (200, 100, 20) and skew values for hold analysis (100, 50, 10) are stored in pairs as the ideal skew table as shown in FIG. 5. That is, the format of the ideal skew table is: (definition point, setup skew, hold skew). In addition, when a plurality of clocks are involved, the table will be provided under each clock name (CLOCK= . . . ).

Next, the delay calculation portion 13 calculates each cell delay, setup_time, hold_time, and interconnection delay with reference to the cell delay library 25 on the basis of the resistance and capacitance values of wiring obtained from the SPEF 24 (step S3). Besides, this calculation of delay time may also be carried out later.

Next, the slack calculation portion 14 derives the ideal skew value for each path between the FFs, and calculates required_time to figure out the slack value (step S4). For example, the path (P1) from the start point FF1 to the end point FF2 of the circuit shown in FIG. 3 is taken into account. If the clock network is traced from FF1 and FF2 respectively (step S11 of FIG. 7), it can be known that the branch point (L2_1) is the CRPR branch point (common clock path up to L2_1) of FF1 and FF2 (step S11 of FIG. 7). Next, if the definition point (L2_1) is searched in the ideal skew table, the third line of FIG. 5 is relevant (step S13 of FIG. 7). Thereby, the ideal skew value for setup analysis "20" is acquired (step S14 of FIG. 7).

Next, the slack calculation portion 14 performs slack calculation (step S15 of FIG. 7). In particular, with respect to the respective cells which form the paths, required_time is first calculated by utilizing the cell delay, setup_time, and interconnection delay which were figured out by the delay optimization portion 13, and the acquired ideal skew value. Required_time for setup analysis is calculated by "clock_period−ideal skew−setup_time". Further, required_time for hold analysis is calculated by "hold_time+ideal skew". Next, arrival_time is calculated by "Σ cell delay +Σ interconnection delay" of the cell and net which compose the data line. The slack value is calculated by "required_time−arrival_time". In the same manner, on the path from the start point FF2 to the end point FF3 of FIG. 3 (see P2), the CRPR branch point is (L1_1), and thus "100" is acquired as the ideal skew for setup analysis. Further, on the path from the start point FF3 to the end point FF4 of FIG. 3 (see P3), the CRPR branch point is (MESH1), and thus "200" is acquired as the ideal skew for setup analysis. Utilizing this method, it is possible to derive the slack value between each pair of FFs. Besides, the slack values for hold analysis can also be calculated in the same manner.

Finally, when the information processing apparatus 1 functions as a layout optimization system, the delay optimization portion 15 performs delay optimization for the path group of violation verified by the slack calculation portion 14, returns to the delay calculation unit to see if the violation paths have disappeared, and repeats this process until the predetermined termination condition (time limit or repeat loop number) is met (step S5 of FIG. 6).

Further, when the information processing apparatus 1 functions as a delay verification system, first, in the same manner as from step S1 to step S4 of FIG. 6 described hereinabove, the slack calculation is performed (steps S101 to S104). Then, the report output portion 16 outputs mainly the information of violation path, including the complementary information such as the slack value, the arrival_time, setup_time and hold_time of the calculation process (step S105 of FIG. 8).

Herein, FIGS. 9, 10A, and 10B show the effect resulted from the layout optimization performed for the circuit by the information processing apparatus 1 in accordance with the exemplary embodiment. First, the "virtual_skew" record of FIG. 9, and FIG. 10B are the data of implementing the layout optimization system in accordance with the present invention, and the "ideal_skew" record of FIG. 9, and FIG. 10A are the data of utilizing a uniform skew value. Then, in FIGS. 10A and 10B, the white mark "x" indicated with the number 210 shows the geometry error point indicating a place of violation of the metal pattern rule in manufacturing such as the predetermined allowable distance between wirings and the like; the point indicated with the number 220 of the color approximately two grade deeper than the former shows the hold guarantee gate inserted by the optimization. As shown in these diagram and graphs, according to the system of the present invention, it can be known that the hold guarantee buffer is improved in prevention of excessive insertion, the site utilization is reduced by 3% to 5%, and the performance time for layout optimization is improved or reduced by 9% to 25%. Further, before the detailed clock analysis is made with "SPICE (Simulation Program with Integrated Circuit Emphasis)" which is a software for simulating behaviors of electronic circuits, through utilizing a high-precision skew in compliance with each circuit condition rather than a uniform ideal skew of fixed value, delay optimization and delay verification become possible.

In the above manner, according to the present invention, between each pair of the elements, for example, at each branch point between the elements, because the ideal skew value is predetermined and stored respectively, even in the LSI design, it is possible to calculate the slack value by utilizing the skew value corresponding to each pair of the elements. Therefore, it is possible to facilitate speed-up of the process.

<Supplementary Notes>

The whole or part of the exemplary embodiment disclosed hereinabove can be described as the following supplementary notes. Hereinbelow, descriptions will be made in reference to the functional block diagram of FIG. 11 with respect to an outline of a configuration of an information processing apparatus in accordance with the present invention, that is, an outline of a configuration of an information processing apparatus which functions as the aforementioned layout optimization system or delay verification system. Further, descriptions will also be made with respect to a program and to an information processing method in accordance with the present invention. However, the present invention is not limited to the following configurations.

(Supplementary Note 1)

Figure 11:
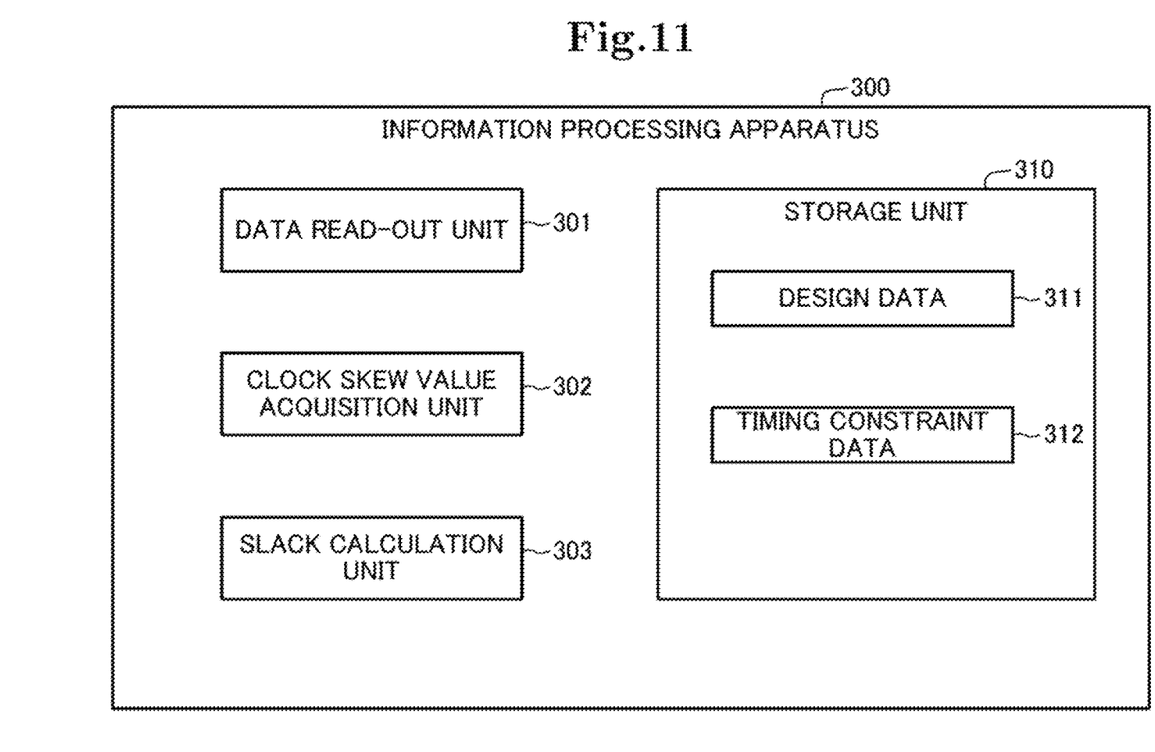
FIG. 11 is a functional block diagram showing a configuration of an information processing apparatus in accordance with supplementary notes of the present invention.

An information processing apparatus 300 comprising:

a storage unit 310 having stored a design data 311 denoting layout and connection of a pre-designed circuit, and a timing constraint data 312 including a clock skew value being preset respectively between a pair of elements in layout in the circuit and denoting a delay difference allowed for a clock inputted to each of the pair of elements from one of which to the other of which a data is inputted;

a data read-out unit 301 for reading out the design data and the timing constraint data from the storage unit;

a clock skew value acquisition unit 302 for acquiring the clock skew value set in correspondence with the pair of elements in layout in the circuit denoted by the design data from the timing constraint data; and a slack calculation unit 303 for calculating a delay time between the pair of elements on the basis of the design data, and calculating a slack value indicating whether or not the pair of elements meets a predetermined design requirement by utilizing the acquired clock skew value and the calculated delay time with respect to the pair of elements.

(Supplementary Note 2)

The information processing apparatus according to Supplementary Note 1, wherein the clock skew value included in the timing constraint data is preset respectively at a branch point of the circuit in which the pair of elements is distributed; and the clock skew value acquisition unit acquires the clock skew value in respective correspondence with the branch point in the circuit denoted by the design data as the clock skew value between the pair of elements distributed by the branch point.

(Supplementary Note 3)

The information processing apparatus according to Supplementary Note 2, wherein the circuit denoted by the design data is such that has a tree structure circuit at the stage after a mesh clock circuit; and the branch point in correspondence with the clock skew value included in the timing constraint data is included in the mesh clock circuit per se and in the tree structure circuit.

(Supplementary Note 4)

The information processing apparatus according to any one of Supplementary Notes 1 to 3, wherein the timing constraint data includes a clock skew value for setup and a clock skew value for hold denoting the delay difference allowed respectively for the clock in data input and in data output at the other element of the pair of elements as the clock skew value; the clock skew value acquisition unit acquires the clock skew value for setup and the clock skew value for hold in correspondence with the pair of elements in layout in the circuit denoted by the design data as the clock skew value from the timing constraint data; and the slack calculation unit calculates the slack value respectively for data input and for data output at the pair of elements on the basis of the clock skew value for setup and the clock skew value for hold.

(Supplementary Note 5)

The information processing apparatus according to any one of Supplementary Notes 1 to 4, wherein the timing constraint data includes the clock skew value set respectively for the clock inputted to the pair of elements; and the clock skew value acquisition unit acquires the clock skew value in correspondence with the clock inputted to the pair of elements in the circuit denoted by the design data from the timing constraint data.

(Supplementary Note 6)

An information processing apparatus comprising:
a storage means having stored a design data denoting layout and connection of a pre-designed circuit, and a timing constraint data including a clock skew value being preset respectively between a pair of elements in layout in the circuit and denoting a delay difference allowed for a clock inputted to each of the pair of elements from one of which to the other of which a data is inputted;
a data read-out means for reading out the design data and the timing constraint data from the storage means;
a clock skew value acquisition means for acquiring the clock skew value set in correspondence with the pair of elements in layout in the circuit denoted by the design data from the timing constraint data; and
a slack calculation means for calculating a delay time between the pair of elements on the basis of the design data, and calculating a slack value indicating whether or not the pair of elements meets a predetermined design requirement by utilizing the acquired clock skew value and the calculated delay time with respect to the pair of elements.

(Supplementary Note 7)

A computer program product comprising computer implementable instructions to make an information processing apparatus function as:
a data read-out unit for reading out a design data and a timing constraint data from a storage unit having stored the design data denoting layout and connection of a pre-designed circuit, and the timing constraint data including a clock skew value being preset respectively between a pair of elements in layout in the circuit and denoting a delay difference allowed for a clock inputted to each of the pair of elements from one of which to the other of which a data is inputted;
a clock skew value acquisition unit for acquiring the clock skew value set in correspondence with the pair of elements in layout in the circuit denoted by the design data from the timing constraint data and
a slack calculation unit for calculating a delay time between the pair of elements on the basis of the design data, and calculating a slack value indicating whether or not the pair of elements meets a predetermined design requirement by utilizing the acquired clock skew value and the calculated delay time with respect to the pair of elements.

(Supplementary Note 8)

The computer program product according to Supplementary Note 7, wherein the clock skew value included in the timing constraint data is preset respectively at a branch point of the circuit in which the pair of elements is distributed; and the clock skew value acquisition unit acquires the clock skew value in respective correspondence with the branch point in the circuit denoted by the design data as the clock skew value between the pair of elements distributed by the branch point.

(Supplementary Note 9)

An information processing method comprising:
reading out a design data and a timing constraint data from a storage unit having stored the design data denoting layout and connection of a pre-designed circuit, and the timing constraint data including a clock skew value being preset respectively between a pair of elements in layout in the circuit and denoting a delay difference allowed for a clock inputted to each of the pair of elements from one of which to the other of which a data is inputted;
acquiring the clock skew value set in correspondence with the pair of elements in layout in the circuit denoted by the design data from the timing constraint data; and
calculating a delay time between the pair of elements on the basis of the design data, and calculating a slack value indicating whether or not the pair of elements meets a predetermined design requirement by utilizing the acquired clock skew value and the calculated delay time with respect to the pair of elements.

(Supplementary Note 10)

The information processing method according to Supplementary Note 9, wherein the clock skew value included in the timing constraint data is preset respectively at a branch point of the circuit in which the pair of elements is distributed; and the clock skew value in respective correspondence with the branch point in the circuit denoted by the design data is acquired as the clock skew value between the pair of elements distributed by the branch point.

According to the present invention described in the above Supplementary Notes, first, in the information processing apparatus, the clock skew value, which denotes a delay difference allowed for the clock inputted to each of a pair of elements in layout at the previous or subsequent stage, is prestored in correspondence with the pair of elements, for example, with the branch point of the circuit in which the pair of elements are distributed, respectively. Then, the information processing apparatus reads in the design data composed of various data denoting the circuit configuration, and acquires the clock skew value corresponding to the pair of elements, for example, to the branch point between the pair of elements on the basis of the design data. Then, it calculates the slack value by utilizing the clock skew value corresponding to the pair of elements. Thereby, it is possible to determine whether or not the current circuit configuration violates the constraint, and thus possible to perform optimization for the circuit configuration or to output a violation report thereafter. Meanwhile, because the clock skew value is preset and stored for the pair of elements, for example, for the branch point between the pair of elements, respectively, it is possible to facilitate speed-up of the process even in LSI design.

Hereinabove, the present invention was described with reference to the exemplary embodiment and the supplementary notes. However, the present invention should not be limited to the exemplary embodiment described above. Those skilled in the art may apply various modifications to the configuration and details of the present invention without departing from the spirit and scope of the present invention.

The present invention can be applied to the CAD systems utilized in circuit design and has an industrial applicability.

The invention claimed is:

1. An information processing apparatus comprising:
a storage unit having stored a design data denoting layout and connection of a part of pre-designed circuit having a tree structure circuit connected at a stage after a mesh clock circuit to be an analysis object, and a timing constraint data including a clock skew value as an ideal skew value being preset between a pair of elements in layout in the circuit and denoting a delay difference allowed for a clock inputted to the pair of elements from one of which to the other of which a data is inputted;
a data read-out unit for reading out the design data and the timing constraint data from the storage unit;
a clock skew value acquisition unit for acquiring the clock skew value set in correspondence with the pair of elements in layout in the circuit denoted by the design data from the timing constraint data;
a slack calculation unit for calculating a delay time between the pair of elements on the basis of the design data, and calculating a slack value indicating whether or not the pair of elements meets a predetermined design requirement by utilizing the acquired clock skew value and the calculated delay time with respect to the pair of elements, and
the clock skew value included in the timing constraint data is preset at a branch point of the circuit in which the pair of elements is distributed;
the branch point in correspondence with the clock skew value included in the timing constraint data wherein the mesh clock circuit serves as a branch point, and each branch of the tree structure circuit portion serves as each branch point;
the clock skew value acquisition unit acquires the clock skew value in correspondence with the branch point in the circuit denoted by the design data as the clock skew value between the pair of elements distributed by the branch point.

2. The information processing apparatus according to claim 1, wherein the timing constraint data includes a clock skew value for setup and a clock skew value for hold denoting the delay difference allowed respectively for the clock in data input and in data output at the other element of the pair of elements as the clock skew value; the clock skew value acquisition unit acquires the clock skew value for setup and the clock skew value for hold in correspondence with the pair of elements in layout in the circuit denoted by the design data as the clock skew value from the timing constraint data; and the slack calculation unit calculates the slack value respectively for data input and for data output at the pair of elements on the basis of the clock skew value for setup and the clock skew value for hold.

3. The information processing apparatus according to claim 1, wherein the timing constraint data includes the clock skew value set respectively for the clock inputted to the pair of elements; and the clock skew value acquisition unit acquires the clock skew value in correspondence with the clock inputted to the pair of elements in the circuit denoted by the design data from the timing constraint data.

4. An information processing apparatus comprising:
a storage means having stored a design data denoting layout and connection of a part of pre-designed circuit having a tree structure circuit connected at a stage after a mesh clock circuit to be an analysis object, and a timing constraint data including a clock skew value as an ideal skew value being preset between a pair of elements in layout in the circuit and denoting a delay difference allowed for a clock inputted to the pair of elements from one of which to the other of which a data is inputted;
a data read-out means for reading out the design data and the timing constraint data from the storage means;
a clock skew value acquisition means for acquiring the clock skew value set in correspondence with the pair of elements in layout in the circuit denoted by the design data from the timing constraint data; and
a slack calculation means for calculating a delay time between the pair of elements on the basis of the design data, and calculating a slack value indicating whether or not the pair of elements meets a predetermined design requirement by utilizing the acquired clock skew value and the calculated delay time with respect to the pair of elements, and
the clock skew value included in the timing constraint data is preset at a branch point of the circuit in which the pair of elements is distributed; and
the branch point in correspondence with the clock skew value included in the timing constraint data wherein the mesh clock circuit serves as a branch point, and each branch of the tree structure circuit portion serves as each branch point;
the clock skew value acquisition means for acquiring the clock skew value in correspondence with the branch point in the circuit denoted by the design data as the clock skew value between the pair of elements distributed by the branch point.

5. A non-transitory computer readable medium storing the program product comprising computer implementable instructions to make an information processing apparatus function as:
a data read-out unit for reading out a design data and a timing constraint data from a storage unit having stored the design data denoting layout and connection of a part of pre-designed circuit having a tree structure circuit connected at a stage after a mesh clock circuit to be an analysis object, and the timing constraint data including a clock skew value as an ideal skew value being preset between a pair of elements in layout in the circuit and denoting a delay difference allowed for a clock inputted to the pair of elements from one of which to the other of which a data is inputted;

a clock skew value acquisition unit for acquiring the clock skew value set in correspondence with the pair of elements in layout in the circuit denoted by the design data from the timing constraint data; and a slack calculation unit for calculating a delay time between the pair of elements on the basis of the design data, and calculating a slack value indicating whether or not the pair of elements meets a predetermined design requirement by utilizing the acquired clock skew value and the calculated delay time with respect to the pair of elements, and the clock skew value included in the timing constraint data is preset at a branch point of the circuit in which the pair of elements is distributed; and the branch point in correspondence with the clock skew value included in the timing constraint data wherein the mesh clock circuit serves as a branch point, and each branch of the tree structure circuit portion serves as each branch point;

the clock skew value acquisition unit acquires the clock skew value in correspondence with the branch point in the circuit denoted by the design data as the clock skew value between the pair of elements distributed by the branch point.

6. An information processing method performed by using an information processor comprising:

by the information processor, reading out a design data and a timing constraint data from a storage unit having stored the design data denoting layout and connection of a part of pre-designed circuit having a tree structure circuit connected at a stage after a mesh clock circuit to be an analysis object, and the timing constraint data wherein the mesh clock circuit serves as a branch point, and each branch of the tree structure circuit portion serves as each branch point, which includes a clock skew value as an ideal skew value being preset between a pair of elements in layout in the circuit and denoting a delay difference allowed for a clock inputted to the pair of elements from one of which to the other of which a data is inputted;

by the information processor, acquiring the clock skew value in correspondence with the branch point in the circuit denoted by the design data as the clock skew value between the pair of elements distributed by the branch point;

by the information processor, calculating a delay time between the pair of elements on the basis of the design data, and calculating a slack value indicating whether or not the pair of elements meets a predetermined design requirement by utilizing the acquired clock skew value and the calculated delay time with respect to the pair of elements.

* * * * *